United States Patent
Reznik et al.

(10) Patent No.: US 7,596,112 B2
(45) Date of Patent: Sep. 29, 2009

(54) METHOD AND APPARATUS FOR RATE COMPATIBLE DIRTY PAPER CODING

(75) Inventors: Alexander Reznik, Titusville, NJ (US); Zhenyu Tu, Bethlehem, PA (US); Guodong Zhang, Farmingdale, NY (US)

(73) Assignee: InterDigital Technology Corporation, Wilmington, DE (US)

(*) Notice: Subject to any disclaimer, the term of this patent is extended or adjusted under 35 U.S.C. 154(b) by 602 days.

(21) Appl. No.: 11/321,806

(22) Filed: Dec. 29, 2005

(65) Prior Publication Data

US 2006/0251175 A1   Nov. 9, 2006

Related U.S. Application Data (60) Provisional application No. 60/664,017, filed on Mar. 22, 2005.

(51) Int. Cl.
*H04B 7/185* (2006.01)

(52) U.S. Cl. .................. 370/318; 370/410; 370/286; 370/356; 370/516; 370/352; 370/252; 370/395.6; 370/466; 379/200; 379/207.02; 379/345; 379/31; 379/300; 379/302; 379/362; 379/239; 379/226; 379/121.01; 455/450; 455/3.06; 455/1; 455/67.11; 455/342; 455/259; 455/101; 455/513

(58) Field of Classification Search ............... 375/260, 375/267; 370/401, 397, 281, 208, 252, 310, 370/388, 555, 410, 286, 356, 466, 524; 455/562.1, 455/69, 67.11, 513, 101, 512, 62, 507, 81; 379/219, 218, 207.2

See application file for complete search history.

(56) References Cited

U.S. PATENT DOCUMENTS

| | | | |
|---|---|---|---|
| 6,937,843 B2* | 8/2005 | Foschini et al. ............... | 455/1 |
| 7,336,658 B2* | 2/2008 | Chang et al. ............... | 370/388 |
| 2003/0074468 A1* | 4/2003 | Chang et al. ............... | 709/238 |
| 2005/0020202 A1* | 1/2005 | Kobayashi ............... | 455/3.06 |
| 2005/0043031 A1* | 2/2005 | Cho et al. ............... | 455/450 |
| 2006/0229031 A1* | 10/2006 | Washiro ............... | 455/81 |
| 2006/0238262 A1* | 10/2006 | Opris ............... | 331/16 |
| 2007/0014299 A1* | 1/2007 | Chang ............... | 370/397 |
| 2007/0066229 A1* | 3/2007 | Zhang et al. ............ | 455/67.11 |
| 2007/0224947 A1* | 9/2007 | Campbell et al. ........... | 455/101 |

OTHER PUBLICATIONS

U. Erez and S. ten Brink, "A Close-to-Capacity Dirty Paper Coding Scheme." Submitted to IEEE Transactions on Information Theory, vol. 51, No. 10, Oct. 2005.

(Continued)

*Primary Examiner*—Rafael Pérez-Gutiérrez
*Assistant Examiner*—Joseph Arevalo
(74) *Attorney, Agent, or Firm*—Volpe and Koenig PC

(57) ABSTRACT

A medium access control (MAC) entity first computes an achievable rate region based on a total transmit power limit and a channel gain of each of a plurality of WTRUs. Next, the MAC entity selects an order of DPC among the WTRUs. A rate set for use in transmitting to the WTRUs is then selected, said rate set being within the computed achievable rate region. Then, based on the selected DPC order and rate set, a DPC entity performs DPC on a plurality of data streams intended for the plurality of WTRUs. If nested lattice-based DPC is utilized, rate compatibility is achieved by selecting proper nesting ratios corresponding to a desired data rate set. Otherwise, if binary-code based DPC is utilized, rate compatibility is achieved via selecting appropriate message input sizes for input to point-to-point coding units prior to performing DPC.

7 Claims, 4 Drawing Sheets

OTHER PUBLICATIONS

W. Yu, W. Rhee, S. Boyd and J. Cioffi, "Iterative water-filling for Gaussian vector multiple access channel", submitted to IEEE Transactions on Information Theory, for publication in vol. 50, No. 1, Jan. 2004 which was first presented in part at the IEEE International Symposium on Information Theory in Washington, DC in Jun. 2001.

H. Weingarten, Y. Steinberg and S. Shamai, "The Capacity Region of the Gaussian MIMO Broadcast Channel," in Proceeding of CISS '04, Mar. 2004.

G. Caire and S. Shamai, "On the achievable throughput of the multiantenna Gaussian broadcast channel," IEEE Trans. Inf. Theory, vol. IT-49, pp. 1691-1706, 2003.

R. Zamir, S. Shamai and U. Erez, "Nested linear/lattice codes for structured multiterminal binning", IEEE Trans. on Inform. , pp. 1250-1276, Jun. 2002.

W. Yu, Competition and Cooperation in Multiuser Communication Environments, Ph.D. Thesis, Stanford U., Stanford, CA, 2002.

W. Yu and J.M. Cioffi, "Trellis precoding for the broadcast channel", IEEE GLOBECOM, Nov. 2001.

U. Erez, S. Shamai and R. Zamir, "Capacity and lattice-strategies for canceling known interference", IEEE Trans. Inf. Theory, vol. 51, No. 11, Nov. 2005 which was first presented in part at the Cornell Summer Workshop on Information Theory, Ithaca, NY in Aug. 2000 and at the IEEE International Symposium on Information Theory and its Applications in Honolulu, Hawaii, Nov. 2000.

G. Caire and S. Shamai, "On achievable rates in a multi-antenna Gaussian broadcast channel," in Proc. 2001 Int. Symp. Inf. Theory.

G. Caire and S. Shamai, "On the multiple-antenna broadcast channel," in Proc. 36th Asilomar Conf. on Signals, Systems and Computers, 2001.

G. Caire and S. Shamai, "On achievable rates in a multi-antenna broadcast downlink," in Proc. 38th Annual Allerton Conf. on Comm. Control and Computing, Monticello, IL, 2000.

M. H. M. Costa "Writing on Dirty Paper," IEEE Trans. Inf. Theory, vol. IT-29, pp. 439-441, 1983.

A. El Gamal and E. C. van der Muelen, "A proof of Marton's coding theorem for the discrete memoryless broadcast channel," IEEE Trans. Inf. Theory, vol. IT-27, pp. 120-122, 1981.

K. Marton, "A coding theorem for the discrete memoryless broadcast channel," IEEE Trans. Inf. Theory, vol. IT-25, pp. 306-311, 1979.

Yu, Wei; Varodayan, David P.; and Cioffi, John M. "Trellis and Convolutional Precoding for Transmitter-Based Interference Pre-Subtraction" pp. 1-20.

\* cited by examiner

METHOD AND APPARATUS FOR RATE COMPATIBLE DIRTY PAPER CODING

CROSS REFERENCE TO RELATED APPLICATION

This application claims the benefit of U.S. Provisional Application No. 60/664,017 filed on Mar. 22, 2005, which is incorporated by reference as if fully set forth.

FIELD OF INVENTION

The present invention is related to wireless communication systems. More particularly, the present invention relates to rate-compatible dirty paper coding (DPC) techniques and apparatus.

BACKGROUND

Modern communication systems support deployments wherein a single source terminal is configured to communicate various types of information to multiple terminals. One example of such a deployment includes a cellular communication system, such as a universal mobile telecommunication system (UMTS), wherein a base station communicates with a plurality of user terminals. Another example deployment includes an access point transmitting to multiple terminals in a wireless local area network (WLAN) system. These single-source-to-multiple-terminal types of deployments are commonly referred to as "broadcasting", "multicasting", or more generally as "point-to-multipoint" (PtM) communications.

Traditional approaches to deploying such PtM communication systems may be classified into one of two categories. In the first category, communication transmissions to the various user terminals are permitted to interfere with each other. An example of such a scheme includes a traditional code division multiple-access (CDMA) system, wherein pseudo-random codes are used to code various communications prior to their transmission. Although pseudo-random coding in the transmission source is useful in mitigating cross-interference, the true burden of mitigating this interference lies in the receiving terminals themselves.

In the second, more frequently utilized category of PtM deployments, interference is altogether avoided via the use of orthogonal transmissions. Examples of such deployments include frequency division multiple access (FDMA) systems and time division multiple access (TDMA) systems, such as for example, a Global System for Mobile Communications (GSM) standard system. In these types of PtM communication systems, a transmitting terminal transmits various communication signals using mathematically orthogonal or non-interfering "vectors" in multi-dimensional "signal spaces". These vectors may be defined as a frequency range (as in a FDMA system) wherein the signal space dimensions (or axes) correspond to different frequencies; a time-slot (as in a TDMA system), wherein the signal space axes correspond to different timeslots; or a Walsh code (as in an orthogonal code CDMA system), wherein the signal space axes correspond to different orthogonal Walsh codes. Unlike the first category of PtM communication systems, the transmitting terminal in this second category is often solely responsible for preventing signal interference. As a result, receiving terminals in such systems are typically no more complex than those used in basic point-to-point communication systems. Although this category of PtM systems is superior in many aspects, such as in transmitter/receiver complexity and in the performance of communication links, it should be understood that the performance of such systems is limited by the number of available orthogonal spaces and/or dimensions.

Figure 1:
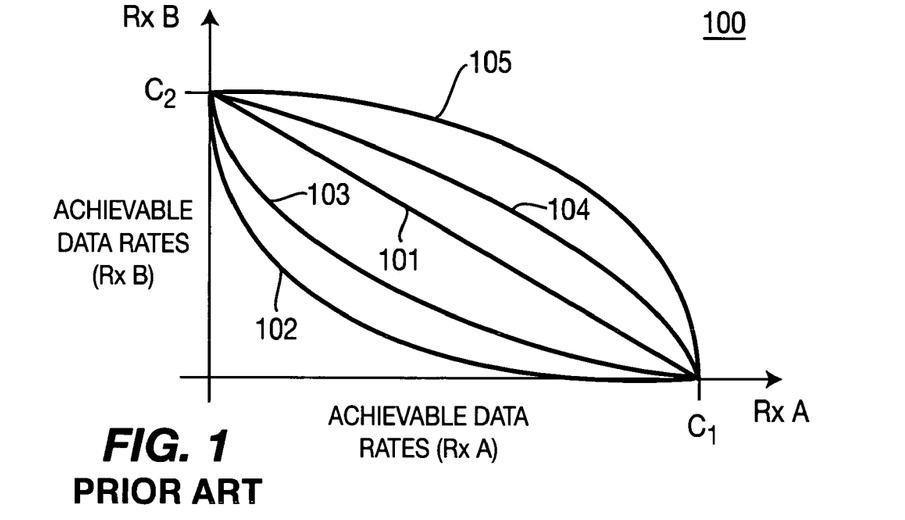
FIG. 1 is a graph illustrating achievable data rate regions to the two receivers.

Referring now to FIG. 1, a graph 100 illustrating achievable data transmission rates 101-105 to the two receivers, Rx A and Rx B, in a PtM system is shown. It should be understood that FIG. 1 is for illustrative purposes only and that is does not represent actual test results.

If all the available transmission bandwidth in a FIG. 1 system were allocated to say, receiver Rx A, Rx A would receive service at a highest achievable data rate $C_1$ and Rx B would receive no data. Similarly, if all the available transmission bandwidth were allocated to receiver Rx B, Rx B would receive service at a highest achievable data rate $C_2$ and Rx A would receive no data.

If receivers Rx A and Rx B were operating in, for example, a TDMA system (which is equivalent to time-sharing), they would be capable of achieving data transmission rates at and to the left of the solid line 101 on the graph 100. As time sharing represents a special case of orthogonal multiplexing, the same rates are achievable by any system which maintains orthogonality between transmission signals.

In a PtM system, where orthogonality between transmission signals is not maintained, the transmission performance to any number of receivers can suffer as compared to that of an orthogonal system, such as TDMA. To illustrate, reference is again made to FIG. 1. Line 102 may be representative of achievable data rates in a typical random code CDMA system utilizing a standard RAKE receiver. Line 103 may be representative of achievable data rates in a typical random code CDMA system utilizing a more advanced linear receiver, such as a linear MMSE multi-user detector. As indicated by the graph 100, the achievable data rates represented by line 103 are superior to those represented by line 102. Neither provides, however, the performance of line 101, which as described above, represents an achievable performance rate of transmission signals that are maintained orthogonal to each other.

It is well known from information theory that data rates superior to that of orthogonal coding (e.g., TDMA) are achievable in PtM systems. These superior data rates may be represented, for example, by lines 104 and 105 of the graph 100 shown in FIG. 1. To achieve these superior data rates 104, 105, however, requires the use of receiver structures that are far more advanced then those used in typical receivers. To illustrate, information-theoretic successive interference cancellation (IT-SIC) can improve the performance of a CDMA system to where it actually performs better than TDMA systems. While such a result is counterintuitive at first, it is noted that the performance of a TDMA system is limited by the availability of orthogonal or non-interfering time-slots. IT-SIC structures allow interference, but in a controlled manner, and shift interference cancellation to the receivers. Utilizing IT-SIC structures enables a CDMA system to achieve data rates beyond those achievable with TDMA systems, as indicated by the line 104 on the graph in FIG. 1.

There are several problems with this IT-SIC approach. First, it requires highly complex receivers. Providing complex receivers is particularly problematic in modern cellular systems, wherein receivers are expected to fit into relatively small, inexpensive terminal units with limited battery life. In addition, IT-SIC receivers must possess information regarding both their own communication channel and the communication channels of all other receivers in the system. Dissemination of such channel information in practical communication systems is highly challenging.

The problems cited above may be addressed using a technique called dirty paper coding (DPC). It is known theoretically that DPC performs at least as well as IT-SIC, and in many cases better, as illustrated by line 105 on the graph 100 in FIG. 1. Recent results have shown that DPC is an optimal communication strategy for certain multiple-input multiple-output (MIMO) PtM communication systems. In addition to providing for superior system performance, DPC has the added benefit of being a transmit-side ("pre-coding") technique. In other words, as in traditional TDMA and FDMA systems, the burden and complexity of interference cancellation and/or prevention is dealt with in the transmitting terminal. Unlike TDMA and FDMA, however, DPC is not restricted by the limitations of orthogonal dimensions in a given signal space. As a result, DPC receivers are only required to possess detailed information pertaining to their particular communications. Furthermore, because each DPC receiver operates optimally without possessing details of transmissions intended for other receivers, DPC provides a methodology for hiding transmissions from unintended receivers, thus making it suitable to support data hiding, watermarking, and other security applications. It is noted that although DPC receivers may be somewhat more complex than conventional point-to-point receivers, they are certainly less complex than most sophisticated multi-user receivers, such as those required for IT-SIC.

The term "preceding", as used herein, refers to the mutual coding of multiple data streams while in the transmitter in order to pre-cancel, fully or partially, any interference the data streams may cause each other; as opposed to attempting to cancel interference at individual receiving terminals post-transmission. It should be understood that pre-coding does not specifically imply that further coding steps will be performed, although further coding functions are possible.

While recent analysis of DPC has yielded significant progress in the theoretical understanding of this technique, little is understood about how to build practical communication systems with DPC, and in particular, communication systems in which communication rates tend to vary.

Accordingly, it is desirable to have a method and apparatus that utilizes rate-compatible DPC techniques to optimize system performance and improve signal quality of transmission signals in view of varying communication rates.

SUMMARY

The present invention relates to a method and apparatus for rate compatible dirty paper coding (DPC) in a broadcast channel. A medium access control (MAC) entity first computes an achievable rate region based on a total transmit power limit and a channel gain of each of a plurality of WTRUs. Next, the MAC entity selects an order of DPC among the WTRUs. A rate set for use in transmitting to the WTRUs is then selected, said rate set being within the computed achievable rate region. Then, based on the selected DPC order and rate set, a DPC entity performs DPC on a plurality of data streams intended for the plurality of WTRUs. If nested lattice-based DPC is utilized, rate compatibility is achieved by selecting proper nesting ratios corresponding to a desired data rate set. Otherwise, if binary-code based DPC is utilized, rate compatibility is achieved via selecting appropriate message input sizes for input to point-to-point coding units prior to performing DPC.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment, a receiver, a mobile station, a fixed or mobile subscriber unit, a pager, or any other type of device capable of operating in a wireless environment. When referred to hereafter, the terminology "base station" includes but is not limited to a Node-B, a site controller, an access point or any other type of interfacing device in a wireless environment.

A preferred embodiment of the present invention is best prefaced with a description of dirty-paper-coding (DPC) as it relates to the present invention. For simplicity, DPC will be described with reference to a two-user Gaussian multiple-input multiple-output (MIMO) broadcast channel. It should be understood, however, that DPC is applicable for use with any number of users/receivers in any size PtM implementation.

Figure 2:
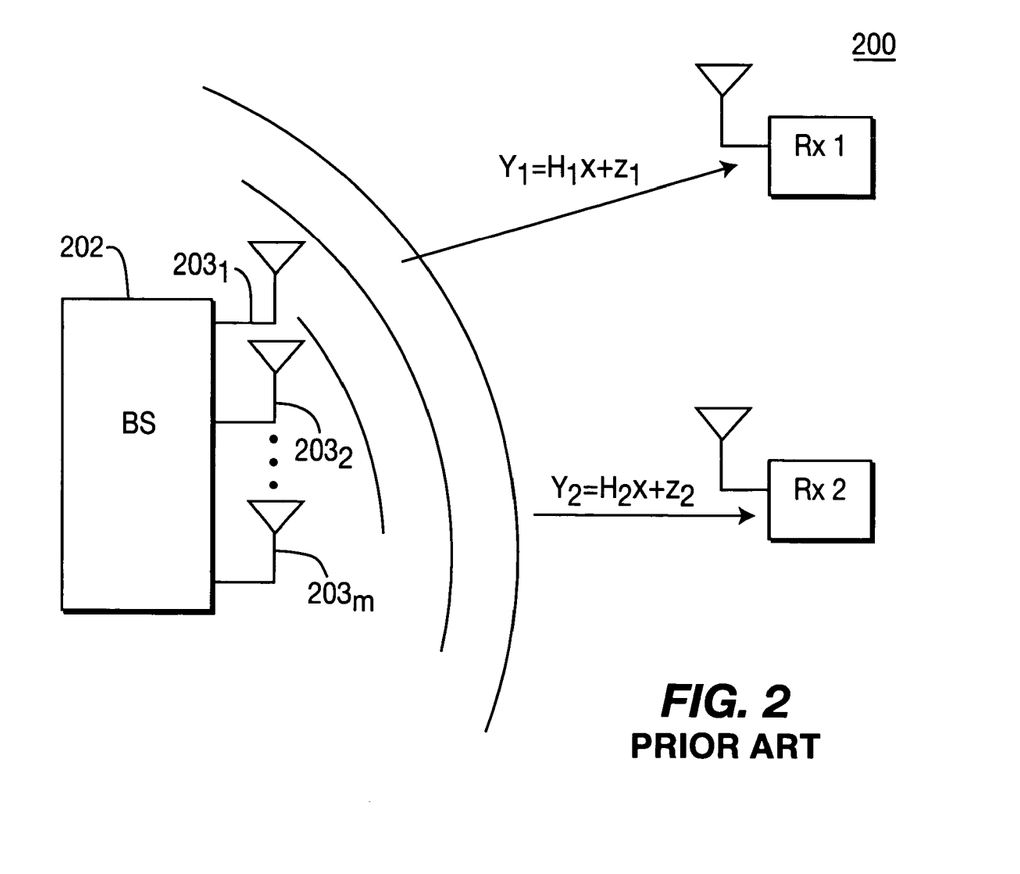
FIG. 2 is a multiple-input, multiple-output (MIMO) wireless communication system.

Referring now to FIG. 2, a conventional MIMO wireless communication system 200 is shown. The system 200 includes a multi-antenna base station 202 configured to engage in PtM communications with multiple receivers, including receivers Rx1 and Rx2. The base station 202 utilizes a 2-user Gaussian MIMO broadcast channel to communicate with the receivers Rx1, Rx2. Signals $y_1$, $y_2$ received at receivers Rx1 and Rx2, respectively, may be expressed by the following Equations:

$$y_1 = H_1 x + z_1 \qquad \text{Equation (1a)}$$

$$y_2 = H_2 x + z_2; \qquad \text{Equation (1b)}$$

wherein $y_k$ is a signal vector received by receiver k. Each signal vector $y_k$ is comprised of $n_k$ elements, wherein $n_k$ is the number of antennas for given receiver k. For simplicity, receivers Rx1 and Rx2 each have only one antenna and thus, $n_1$ and $n_2$ of the present system 200 are each one (1).

The variable x in Equations (1a) and (1b) represents an m-element signal vector transmitted from the base station 202 to the receivers Rx1, Rx2, where m is the number of base station 202 transmit antennas $203_1$, $203_2$, . . . $203_m$. This signal vector x is a composite of independent signals $x_k$ that carry data intended for receiver Rxk. In the present system 200, x is a composite of independent data signals $x_1$ and $x_2$ (not shown), where $x_1$ and $x_2$ carry data intended for receivers Rx1 and Rx2, respectively. The output of this signal vector x has a total power constraint P, such that:

$$\text{Tr } Exx^T \leq P. \qquad \text{Equation (2)}$$

The variable $H_k$ in Equations (1a) and (1b) is an m x $n_k$ matrix representing channel gains from the base station 202 to receiver Rxk, (Rx1, Rx2), wherein $H_k$ is known to the base station 202. The final term in Equations (1a) and (1b), $z_k$, represents the Gaussian noise contribution to receiver Rxk, (Rx1, Rx2). This noise contribution $z_k$ is a jointly-Gaussian zero-mean random vector with $n_k$ elements. For simplicity, it is assumed that all noise vectors $z_k$ in the present system 200 are un-correlated unit-variances. In other words, it is assumed that the covariance matrix for noise vectors $z_k$ is an identity matrix, I. Using standard well-known linear algebra transformations, the noise vectors $z_k$ may collectively be regarded as a general non-singular covariance matrix $\Sigma_k$. Therefore, although the present system 200 assumes unity covariance matrices $z_k$, the system 200 configuration may also be applicable in general.

As noted above, the base station 202 transmits data to both receivers Rx1, Rx2 simultaneously using a single signal vector x. As a result, data $x_2$ intended for receiver Rx2 causes interference in the signal $y_1$ received at receiver Rx1, and data $x_1$ intended for receiver Rx1 causes interference in the signal $y_2$ received at receiver Rx2. Inclusion of this interference in Equations (1a) and (1b) yields Equations (3a) and (3b), respectively:

$$y_1 = H_1 x_1 + H_1 x_2 + z_1 \quad \text{Equation (3a)}$$

$$y_2 = H_2 x_2 + H_2 x_1 + z_2 \quad \text{Equation (3b)}$$

wherein $H_1 x_2$ and $H_2 x_1$ represent the multi-user interference experienced in the received signals $y_1$, $y_2$.

To reduce the effects of this interference, prior to combining and transmitting the data signals $x_1$, $x_2$, the base station 202 utilizes interference pre-coding, i.e., DPC, to pre-cancel interference in one of the data signals $x_1$, $x_2$. Accordingly, the base station 202 determines and applies a covariance matrix $S_k$, (similar to a beam-forming matrix used for well-known beamforming), to each of the independent data signals $x_1$, $x_2$. In the present system 200, $S_1$ is the covariance matrix for data signal $x_1$ and $S_2$ is the covariance matrix for data signal $x_2$.

Once the determined covariance matrices $S_1$, $S_2$ are applied to the data signals $x_1$, $x_2$, one of the signals, say $x_1$, is selected and modified such that when combined with the other signal, $x_2$, that other signal $x_2$ does not interfere with the selected signal $x_1$. The modified signal $x_1$ is then combined with the unmodified other signal $x_2$ to form the composite signal vector x. By pre-canceling the interference to data signal $x_1$, upon receipt of the data vector x, receiver Rx1 is able to demodulate its intended data signal $x_1$ without multi-user interference from data signal $x_2$. As a result, receiver Rx1 is able to achieve an interference-free performance rate $R_1$. Receiver Rx2, on the other hand, experiences interference from data signal $x_1$ in its demodulation of data signal $x_2$. As a result, its performance rate $R_2$ is inferior to that of receiver Rx1, as indicated by Equations (4a) and (4b) below:

$$R_1 = \frac{1}{2} \log |I + H_1 S_1 H_1^H|; \quad \text{Equation (4a)}$$

$$R_2 = \frac{1}{2} \log \frac{|I + H_2 S_2 H_2^H|}{|I + H_2 S_1 H_2^H|}; \quad \text{Equation (4b)}$$

where $S_1, S_2 \geq 0$, where $tr(S_1)$ and $tr(S_2)$ is the total power allocated to receivers Rx1 and Rx2, respectively, and where $tr(S_1) + tr(S_2) \leq P$. Collectively, $R_1$ and $R_2$ represent an achievable rate pair to receivers Rx1 and Rx2.

It should be noted that although data signal $x_1$ was selected for DPC pre-cancellation in the present system 200, data signal $x_2$ could have been selected instead. In such a scenario, and with an appropriate selection of covariance matrices $S_1'$ and $S_2'$ which are different from those used if data signal $x_1$ were selected, receiver Rx2 would be enabled to demodulate its data signal $x_2$ free from multi-user interference caused by data signal $x_1$. As a result, receiver Rx2 would experience a superior performance rate as compared to receiver Rx1, as indicated by Equations (5a) and (5b) below:

$$R_1 = \frac{1}{2} \log \frac{|I + H_1 S_1' H_1^H|}{|I + H_1 S_2' H_1^H|}; \quad \text{Equation (5a)}$$

$$R_2 = \frac{1}{2} \log |I + H_2 S_2' H_2^H|. \quad \text{Equation (5b)}$$

In implementing the above-described pre-cancellation scheme, particularly in a rate-compatible MIMO system, three considerations must be addressed: 1) determining the order of pre-cancellation; 2) determining covariance matrixes $(S_1, S_2, \ldots S_n)$ that yield desirable data rates; and 3) modulating using a DPC scheme that can smoothly adjust to changes in covariance matrices and/or changes in desired data rates. Regarding the first consideration, a fixed order is assumed without loss of generality for purposes of the describing the present invention. The second consideration is not the subject of the present invention and may be achieved using any appropriate techniques, such as for example, via QR decomposition of a channel matrix, MAC-BC duality, etc. The third consideration is the subject of the present invention and is accordingly, discussed below in further detail below.

In a preferred embodiment, nested lattices $(\Lambda_1, \Lambda_2, \Lambda_3 \ldots \Lambda_x)$ are utilized to achieve rate compatible DPC, where $\Lambda_1$ is a fine lattice and $\Lambda_2, \Lambda_3 \ldots \Lambda_x$ represent distinct coarser sub-lattices of the fine lattice $\Lambda_1$. For simplicity, the present embodiment is described in terms of processing two data signals (x1, x2) intended for two receivers (Rx1, Rx2), respectively. It should be understood, however, that the present embodiment may be extended and applicable to any number of data signals for any number of receivers in any type of communication system, including MIMO, SISO (single-in, single-out), etc.

Figure 3:
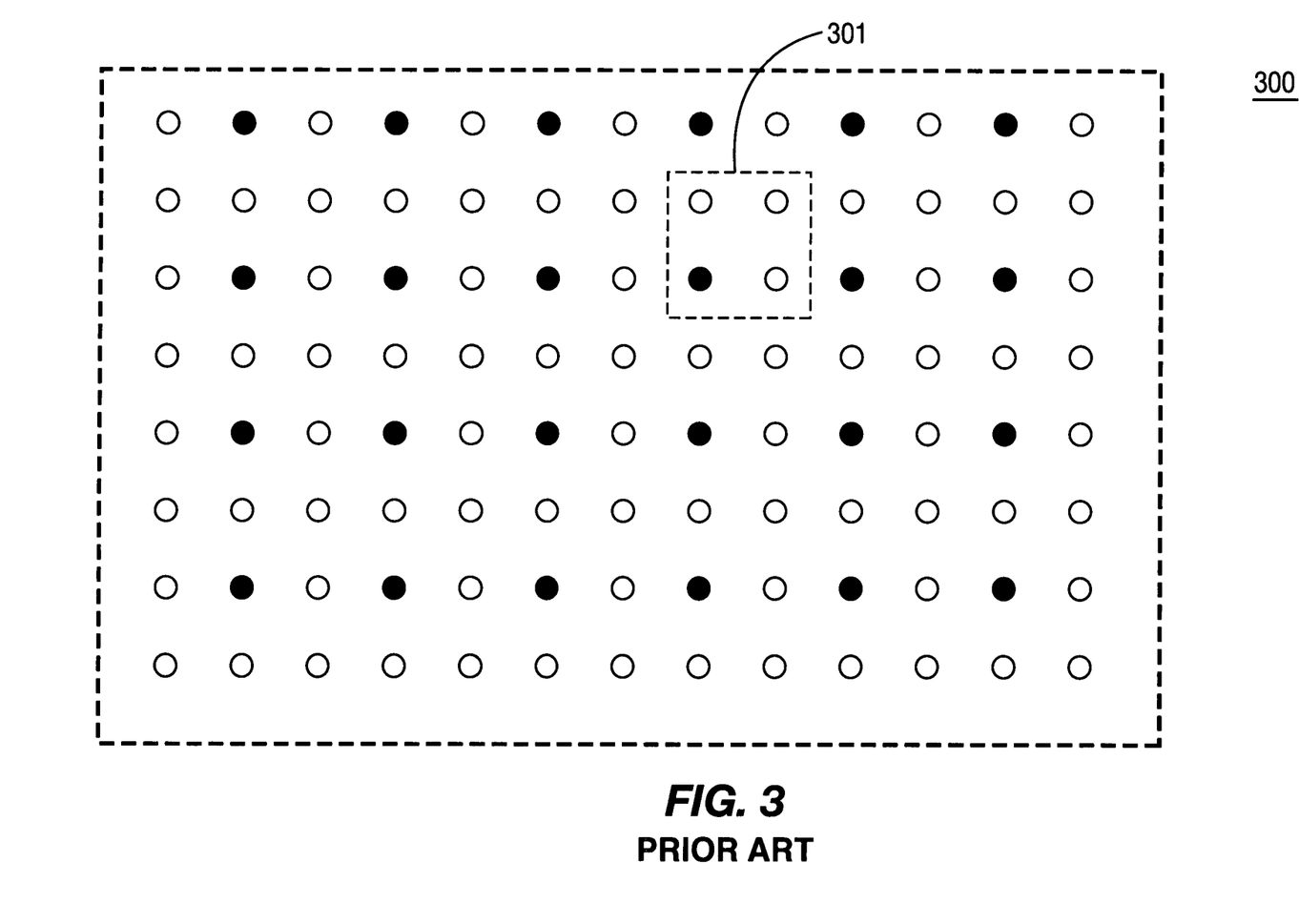
FIG. 3 is a fine lattice portion with a corresponding course sub-lattice.

By way of background, reference is now made to FIG. 3, wherein a portion of a fine (square) lattice 300 is shown. This fine lattice portion 300 has a "nesting" ratio of four and comprises a coarse sub-lattice, indicated by the shaded points. The nesting ratio is determined by partitioning the fine lattice portion 300 into equal regions or cells such that each cell contains exactly one point of the sub-lattice. Since the resulting cells, e.g. cell 301, each contain exactly four points, the fine lattice portion 300 is described as having a nesting ratio of four. It should be noted that lattice cells preferably configured with a sub-lattice point at their center. As shown in FIG. 3, however, such a cell configuration is not always possible. Lattice cell 301, for example, lacks the cell size to accommodate a centered sub-lattice point. It should also be noted that if the FIG. 3 lattice portion 300 were expanded to a full 16×16 lattice, it could be representative of a 256 QAM modulation alphabet, wherein the sub-lattice with a nesting factor of four would represent a modulation alphabet of 64 QAM.

Rate compatible DPC is achieved using nested lattices by first establishing a fine lattice $\Lambda_1$ for use in transmitting a joint signal vector. Coarser sub-lattices $\Lambda_2, \Lambda_3 \ldots \Lambda_x$ of the fine lattice $\Lambda_1$ are then defined such that each sub-lattice $\Lambda_2$, $\Lambda_3 \ldots \Lambda_x$ is distinct and represents a nesting ratio associated with an achievable data rate. A first of the sub-lattices $\Lambda_2$, $\Lambda_3 \ldots \Lambda_x$, say $\Lambda_2$, is then selected according to a data rate, say R1, desired for a particular receiver, say Rx1. This selected sub-lattice $\Lambda_2$ is then modulated with a first data signal x1 intended for that particular receiver Rx1. The second data signal x2 intended for receiver Rx2 is then modulated according to any appropriate modulation scheme.

Once the data signals x1, x2 have been modulated, the second data signal x2 is pre-cancelled from the first data signal x1. Pre-cancellation entails modifying the first data signal x1 such that when it is combined with the second, non-modified signal x2 (i.e., an interference signal), that second signal x2 does not interfere with the first signal x1. To perform pre-cancellation, coding, rate matching, etc. are performed for the first data signal x1 as if it were being modulated onto a coarse sub-lattice $\Lambda_2$. The second signal is then scaled according to some appropriate factor. This scaling factor may be determined according to covariance matrices associated with both data signals x1, x2, respectively. Additionally or optionally, a low power random signal, known as a dither, may be defined for use in improving performance. Although this optional dither is random, it is known in advance to the transmitter and receiver of these data signals.

The modified first data signal x1, the scaled second data signal x2, and the optional dither are then summed to form a single signal vector and quantized to a point on the fine lattice $\Lambda_1$ that is closest to the resulting signal vector. Optionally, if the intended receivers Rx1, Rx2 are not configured to, or are otherwise prevented from becoming aware of the selected data rate R1, the single signal vector may be combined with a minimal amount of control data prior to being transmitted to the receivers, Rx1, Rx2. This control data includes the selected data rate R1, which corresponds directly to the selected sub-lattice $\Lambda_2$ used to modulate the data signal x1 intended for receiver Rx1.

At the first receiver Rx1, wherein the first data signal x1 is expected, the single signal vector is received and processed using the data rate R1 information. As noted above, this data rate R1 information may be provided as part of the signal vector, or it may be obtained by the receiver Rx1 via any appropriate means. Since there is a one-to-one correspondence between the data rate R1 and the sub-lattice $\Lambda_2$, the receiver Rx1 is able to demodulate its data signal x1 properly based solely on the provided data rate R1 information. In addition, as a result of the pre-cancellation, the first data signal x1 is demodulated at the first receiver Rx1 without the effects of interference from the second data signal x2. At the second receiver Rx2, operations consistent to whatever modulation scheme was utilized are performed to process the received signal vector. The performance of this receiver Rx2, however, will be subject to interference from the first data signal x1.

If at any later point in time a data rate to a particular receiver is desired to be changed, rather than re-selecting a new fine lattice $\Lambda_1$, one of the pre-defined nested sub-lattices $\Lambda_3$, $\Lambda_4, \ldots \Lambda_x$ for that particular receiver is selected for use in achieving the nesting ratio required to provide the new data rate. To illustrate, reference is again made to the FIG. 2, system 200.

Suppose the system 200 of FIG. 2 utilizes a 256 QAM (quadrature amplitude modulation) modulation scheme. A 256 QAM modulation indicates that each data signal has 256-point lattice points onto which data may be modulated. These 256 points are preferably arranged in a square lattice with equal vertical and horizontal spacing, although other configurations are possible. Assuming the data is binary, eight (8) bits of data per symbol may be transmitted. Referring again to FIG. 3, if the fine lattice portion 300 were expanded to a full 16×16 lattice, it would be representative of the 256 QAM modulation alphabet, wherein the sub-lattice with a nesting factor of four would represent a modulation alphabet of 64 QAM.

To achieve rate compatible DPC in the FIG. 2 system 200, a fine lattice $\Lambda_1$ is first established. Next, courser sub-lattices $\Lambda_2, \Lambda_3, \Lambda_4, \ldots \Lambda_x$ are defined, wherein each sub-lattice represents a nesting ratio associated with an achievable data rate. Based on predetermined priorities and other factors, a weighted data rate (R1, R2) is assigned to each data signal $x_1$, $x_2$, respetively, wherein R1 is preferably greater than R2. Regardless of the relative relationship between R1 and R2, selection of R1 constrains R2. A first sub-lattice, say $\Lambda_2$, capable of enabling the desired data rates (R1, R2) is then selected for use in modulating the first data signal $x_1$. If the appropriate sub-lattice $\Lambda_2$ corresponds to a 64-QAM sub-lattice, for example, then data signal $x_1$ intended for receiver Rx1 is modulated using this 64-QAM scheme.

Once the first data signal $x_1$ is modulated accordingly, the second data signal $x_2$, intended for receiver Rx2, is modulated according to any appropriate modulation scheme and pre-cancelled from the first data signal $x_1$, as described above. The second data signal $x_2$ is then scaled and combined with the modified first data signal $x_1$. The data signals $x_1$, $x_2$ are then summed and optionally combined with a dither to form a single signal vector x. The signal vector x is then quantized to the fine lattice $\Lambda_1$. Optionally, the signal vector may be combined with data rate R1 control information for use in processing the signal vector x at the receiver Rx1.

Upon receiving the combined signal vector x, receiver Rx1 processes the signal vector x using data rate R1 information. This data rate R1 information may be provided as part of the signal vector x, or it may be obtained by the receiver Rx1 via any other appropriate means. Since there is a one-to-one correspondence between the data rate R1 and the selected sub-lattice $\Lambda_2$, the receiver Rx1 is able to demodulate its data signal x1 properly based solely on the provided data rate R1 information. In addition, as a result of pre-cancellation, the data signal $x_1$ intended for receiver Rx1 is demodulated without interference from the second data signal $x_2$. At receiver Rx2, however, the signal vector x is processed as if it were modulated according to the scheme used to modulate data signal $x_2$. As a result, receiver Rx2 will be subject to interference from the data signal $x_1$ intended from receiver Rx1.

If at a later point, a data rate to a particular receiver Rx1, Rx2 is desired to be changed, rather than re-selecting a new fine lattice $\Lambda_1$, one of the sub-lattices $\Lambda_3, \Lambda_4, \ldots \Lambda_x$ capable of enabling the desired data rate is re-selected to provide a proper nesting ratio to achieve the new data rate. The data signals $x_1$, $x_2$ are then re-modulated, pre-cancelled, re-combined, and re-transmitted as described above.

Although nested-lattice based DPC has been described in terms of processing two data signals intended for two receivers, it should be understood that the present embodiment may be extended and applicable to any number of data signals for any number of receivers in any type of communication system, including MIMO, SISO (single-in, single-out), etc. In a three-receiver system (Rx1, Rx2, Rx3), for example, a first data rate R1 is selected for use in transmitting data x1 to a first of the receivers, say Rx1. This data rate R1 constrains the data rates of receivers Rx2 and Rx3. Subject to this constraint, a second data rate R2 is selected for transmitting data x2 to a second receiver, say Rx2, which also serves as the maximal data rate for data x3 intended for receiver Rx3.

Once the data rates R1, R2 are selected, corresponding sub-lattices $\Lambda_2$ and $\Lambda_3$ are selected and modulated with the data x1, x2 intended for receivers Rx1 and Rx2, respectively. The data x3 intended for receiver Rx3 is modulated according to any appropriate modulation scheme. Next, data signal x3 is scaled and pre-cancelled from data signal x2, generating a fine lattice point. The modified data signal x2 is then combined with the data signal x3 and the x2-x3 combination is scaled and pre-cancelled from data signal x1. The modified data signal x1 is then combined with the x2-x3 combination and transmitted as a single signal vector. Optionally, the data rate R1, R2 information may be combined with the single signal vector for use in processing the received signal vector at receivers Rx1 and Rx2.

At the receivers, receiver Rx1 processes the signal vector and demodulates its data x1 using the R1 rate information. Similarly, receiver Rx2 processes the signal vector and demodulates its data x2 using the R2 rate information. The third receiver Rx3 demodulates its data x3 according to the modulation scheme initially used to modulate the data x3. As a result of pre-cancellation, receiver Rx1 experiences no interference from the other data signals, receiver Rx2 experiences interference from the receiver Rx1 data signal x1, but no interference from the receiver Rx3 data x3, and receiver Rx3 experiences interference from both data signals x1 and x2.

The rate compatible DPC scheme of the present embodiment may be implemented in an appropriately configured transmitter comprising a MAC entity and a DPC coder. Based on a total transmit power limit and on channel gain information, the MAC entity first computes an achievable rate region. Next, the MAC entity selects an order of DPC coding among a number of intended WTRU. An achievable rate set and corresponding nesting ratio are then selected by the MAC entity to achieve a desired data transmission rate. The MAC entity then computes the number of bits to be transmitted for each WTRU, formats the bits, and forwards the data block to the DPC coder, wherein nested-lattice coding is performed in accordance with the present embodiment. To achieve rate-compatibility, the MAC entity is further configured to adjust and re-select nesting ratios that correspond to desired rate changes.

Figure 4:
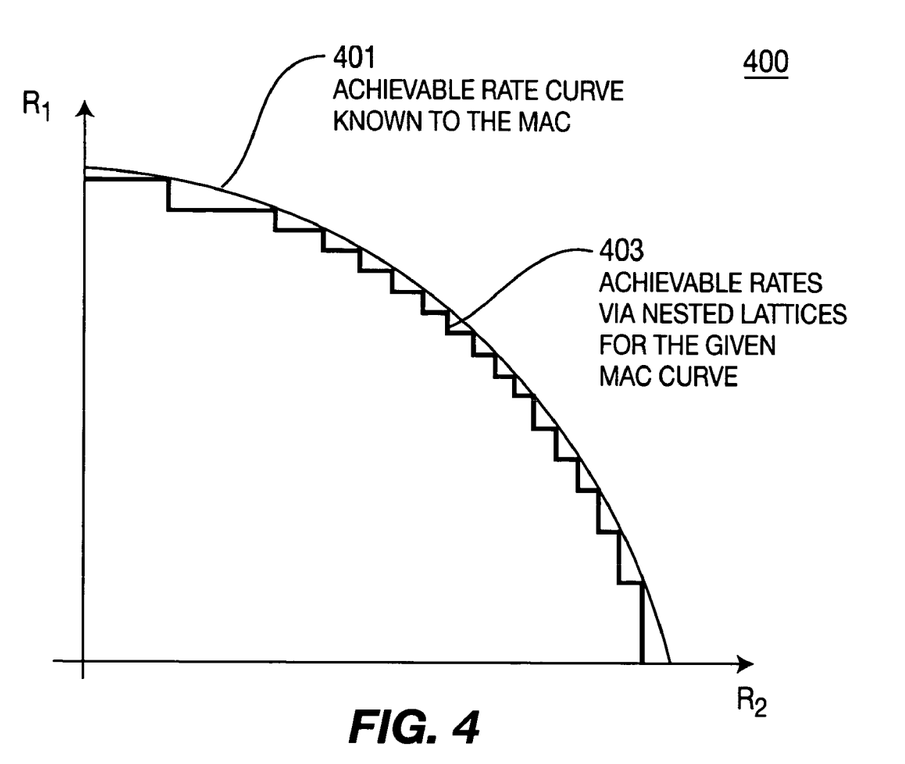
FIG. 4 is a graph illustrating achievable data rates with a nested-lattice approach in accordance with the present invention.

It should be noted that all data rates for a given data signal vector $x_n$ may be defined by pairs of nested lattices, $(\Lambda_1, \Lambda_2)$, $(\Lambda_1, \Lambda_3)$, ... wherein a fine lattice $\Lambda_1$ is fixed for a given signal vector and wherein multiple sub-lattices $\Lambda_2$, $\Lambda_3$, etc., are defined to accommodate various data rates for that signal vector. Referring now to FIG. 4, a graph 400 illustrating a rate tradeoff curve 401 is shown. This rate tradeoff curve 401 represents the achievable data rate pairs (R1, R2) for a two-user system. If the rate tradeoff curve 401 is known to a MAC, this curve 401 is simply a capacity curve 401 of the present system. If, however, the MAC is unaware of achievable data rate pairs (R1, R2), then the rate curve 401 represents sub-optimal achievable rate pairs.

Also shown in the graph 400 is a step-like rates curve 403 achievable via the nested lattice approach of the present invention. As the graph 400 illustrates, only certain points on the rate tradeoff curve 401 intersect the rates curve 403 achievable via nested lattices. These intersection points correspond to valid combinations of nested lattices 403 and thus, only those rate pairs designated by these points can be achieved. It should be noted, however, that intermediate data rates, i.e., points on the rate tradeoff curve 401 that do not intersect the nested lattice curve 403, may still be achieved by utilizing valid nested lattice combinations that precede and/or follow the intermediate rates.

In an alternate embodiment, binary coding is utilized to provide rate-compatible DPC. For simplicity, the present embodiment is described in terms of processing two data streams intended for two WTRUs. It should be understood, however, that the present embodiment may be extended and applicable to any number of data streams for any number of receivers in any type of communication system, including MIMO, SISO (single-in, single-out), etc.

First, a MAC entity statically selects a maximal data rate and code parameters for each of a plurality of WTRUs. This maximal data rate represents the maximum data rate a WTRU would experience if it were the only WTRU receiving data. The MAC entity then determines an instantaneous data rate for each of the plurality of WTRU. The determination of these instantaneous rates depends on data delivery requirements as well as on the capabilities and cross-interference nature of transmission channels.

The data streams are then padded with known data, (typically zeros), via, for example, padding units. This known data is inserted evenly throughout the data streams such that each resulting padded data stream has its predetermined maximum data rate. A standard point-to-point coding, (e.g. Turbo code), is then applied to each padded data stream which are tuned to the maximum data rates. The coded data is then fed into a DPC coder/combiner entity. Based on the selected data rates and known instantaneous channel characteristics, the DPC coder/combiner entity then generates a single output stream if SISO is used. Alternatively, if MIMO is utilized, multiple streams may be generated for transmission via multiple antennas. The single or multiple data streams are then transmitted to the WTRUs where they are received and decoded.

In order to properly decode the received data stream(s), each WTRU (not shown) preferably comprises a decoder configured to be aware of what data was prefixed. For example, the WTRUs (not shown) may comprise belief-propagation decoders, such as conventional Turbo or low density parity check (LDPC) decoders, which may be easily configured to be aware of the prefixed bits by setting their respective likelihood of these bits being zero to infinity. If a WTRU is not configured with such a decoder, it will still be able to process DPC coded data streams, but with at most, some minor performance degradation.

It should be noted that DPC pre-coding is only necessary when more than one WTRU's data is to be placed onto a single beam. When large amounts of data are involved, DPC pre-coding may be combined with time division multiplexing (TDM) or some other orthogonal modulation scheme, such as FDMA or orthogonal CDMA to process the single data stream. Preferred DPC pre-coding schemes include Tomlinson-Harashima pre-coding and a simple addition with a ternary valued output pre-coding.

Figure 5:
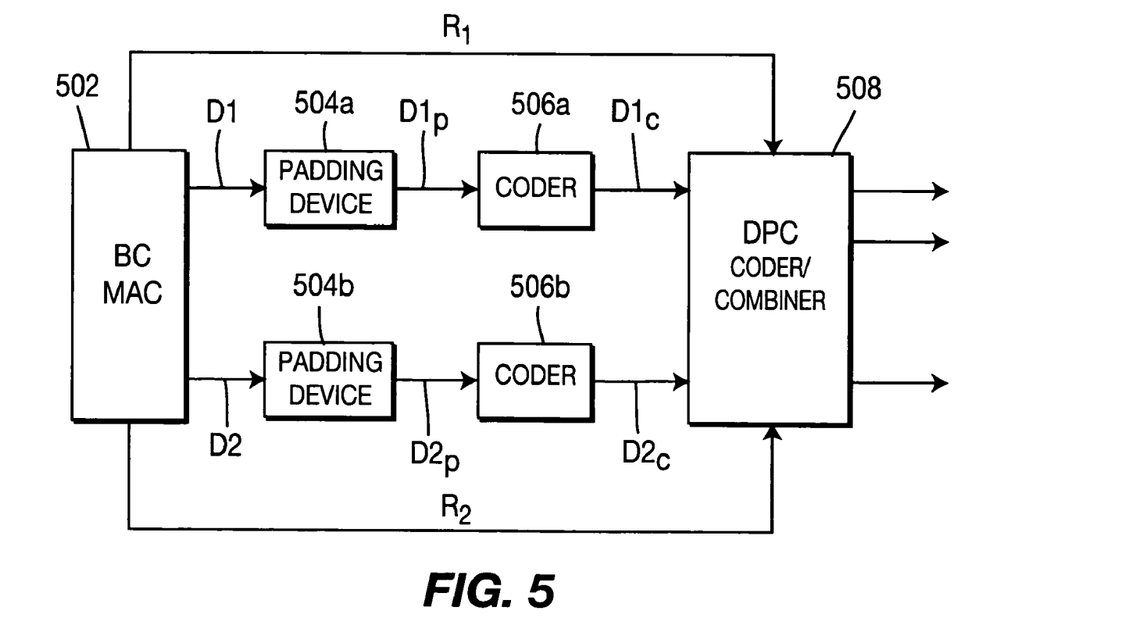
FIG. 5 is a block diagram of a transmitter for use in implementing rate compatible dirty paper coding (DPC) in accordance with the present invention.

Referring now to FIG. 5, a transmitter 500 configured in accordance with the present embodiment is shown. The transmitter 500 comprises a MAC entity 502, padding devices 504a, 504b, coders 506a, 506b, and a DPC coder/combiner 508. For simplicity, the architecture of the transmitter 500 is configured to process two data streams D1, D2 for two WTRUs (not shown). It should be understood, however, that the transmitter 500 may be configured to process any number of data streams for any number of users in any type of communication system, including MIMO, SISO (single-in, single-out), etc.

The transmitter 500, via the MAC entity 502, first begins by computing an achievable rate region based on a total transmit power limit and a channel gain of each WTRU (not shown). The MAC entity 502 then selects an order of DPC coding among the WTRUs (not shown) and determines an instantaneous data rate R1, R2 for each WTRU (not shown). The determination of these instantaneous rates R1, R2 depends on data delivery requirements as well as on the capabilities and cross-interference nature of transmission channels.

The data streams D1, D2 are then padded with known data, (typically, zeros), via the respective padding units 504a, 504b. The padding units 504a, 504b insert zeros evenly throughout the data streams D1, D2 such that each padded output $D1_p$, $D2_p$ achieves the desired data rates R1, R2. The padded data streams $D1_p$, $D2_p$ are then coded via the coders 506a, 506b. The coded data $D1_c$, $D2_c$ is then fed into the DPC coder/combiner 508. Based on the rates R1, R2 and known instantaneous channel characteristics, the DPC coder/combiner 508 generates a single output stream if SISO is used. Alternatively, if MIMO is utilized, multiple streams may be generated for transmission via multiple antennas. The single or multiple data streams are then transmitted to the WTRUs (not shown) where they are received and decoded.

If at a later point a data rate change is desired, the MAC entity 502 selects an appropriate message input size for the coders 506a, 506b and sends this information to the respective padding units 504a, 504b. The padding units 504a, 504b then re-pad the data streams D1, D2 in accordance with the message input size(s). In this manner, the transmitter 500 is able to smoothly adjust the data rates.

Figure 6:
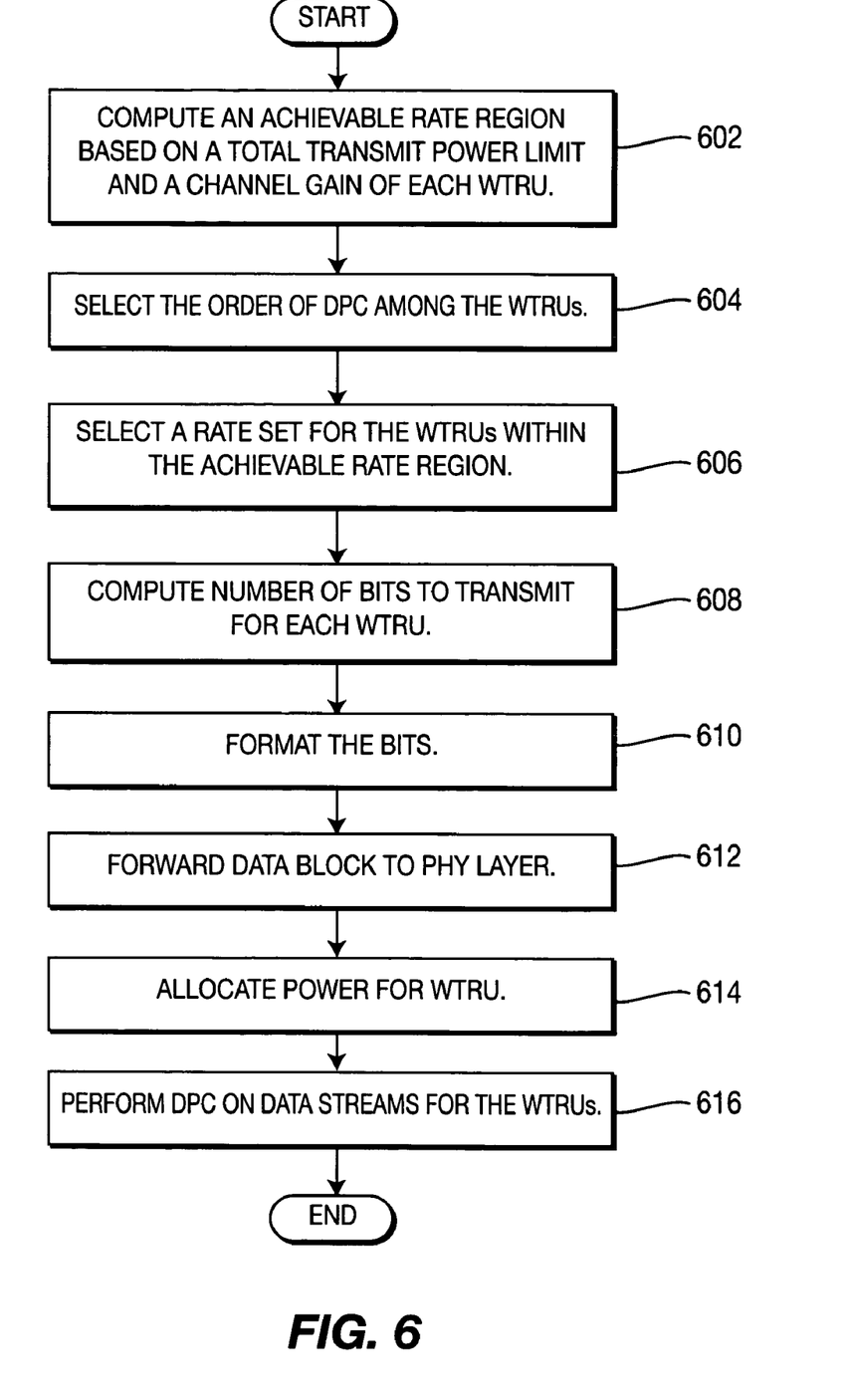
FIG. 6 is a flow diagram of a MAC process for rate compatible DPC in accordance with the present invention.

Referring now to FIG. 6, a MAC process 600 for use in facilitating rate-compatible DPC in accordance with the present invention is shown. Based on a total transmit power limit and a channel gain for each of a plurality of WTRUs, a MAC first computes an achievable rate region (step 602). Next, at an initial session setup or at a system change, (i.e., change in number of WTRUs, channel gains, etc.), the following steps are performed based on a number of factors, such as WTRU capability, priority, required quality of service (QoS), experienced QoS, etc.

The MAC selects an order of DPC coding among the WTRUs (step 604). Next, an appropriate rate set within its achievable rate region is selected for the WTRUs (step 606). The MAC then computes the number of bits to be transmitted for each WTRU (step 608), formats the bits (step 610), and forwards the data block to the physical layer (step 612), wherein a DPC coder/combiner performs DPC given the inputs from the MAC (not shown). The MAC then allocates a power for each WTRU and notifies the physical layer of the power allocation (step 614). In the physical layer, DPC is performed on the data streams (step 616) prior to transmission to the WTRUs.

It should be noted that if a lattice-based DPC method is utilized by the DPC coder/combiner, the MAC further selects a proper nesting ratio to achieve a desired data rate (step 606). Otherwise, if a binary-code DPC method is utilized, the MAC selects an appropriate message input size for use in each coder (step 606).

The features of the present invention may be incorporated into an IC or be configured in a circuit comprising a multitude of interconnecting components.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in facilitating rate compatible dirty paper coding (DPC) for a plurality of wireless transmit/receive units (WTRUs) in a broadcast channel, the method comprising:
   computing an achievable rate region based on a total transmit power limit and a channel gain of each WTRU;
   selecting an order of DPC among the WTRUs;
   selecting a rate set for use in transmitting to the WTRUs, said rate set being within the achievable rate region; and
   performing DPC on a plurality of data streams intended for the WTRUs,
   wherein the performing DPC step is implemented via nested lattice coding, and the performing DPC step further comprises:
   establishing a fine lattice;
   defining a group of nested sub-lattices of the fine lattice, wherein each sub-lattice represents a nesting ratio associated with an achievable data rate;
   selecting a least one sub-lattice to achieve the selected rate set;
   modulating a least a first data stream using a selected sub-lattice;
   modulating at lease one other data stream using any desired modulation scheme;
   pre-cancelling the modulated at least one other data stream from the modulated at least first data stream and combining them into a single signal vector; and
   quantizing the single signal vector onto a fine lattice for transmission to the plurality of WTRUs.

2. The method of claim 1, wherein said method is performed via a medium access control (MAC) entity, the method further comprising:
   computing a number of bits to transmit to each of the WTRUs;
   formatting the bits;
   forwarding the formatted bits to a physical layer (PHY) entity; and
   notifying the PHY entity of a power allocation for the WTRUs.

3. The method of claim 1, further comprising combining the signal vector with the selected rate set information for transmission to the plurality of WTRUs.

4. The method of claim 1, wherein an adjustment to a data rate is desired, the method further comprising:
   selecting a nesting ratio corresponding to a newly selected rate set; and
   re-selecting at least one sub-lattice to achieve the re-selected nesting ratio.

5. A transmitter configured to perform rate compatible dirty paper coding (DPC) for a plurality of wireless transmit/receive units (WTRUs) in a broadcast channel, the transmitter comprising:
   a medium access control (MAC) entity configured to:
      compute an achievable rate region based on a total transmit power limit and a channel gain of each of a plurality of WTRUs;
      select an order of DPC among the WTRUs; and
      select a rate set for the WTRUs within the achievable rate region; and
   a DPC coder configured to perform DPC on data streams intended for the WTRUs, and to combine the DPC-coded data streams into a single signal vector,
   wherein the transmitter is configured to perform DPC via nested lattice coding, and
   wherein the MAC entity is configured to the DPC coder which is configured to re-select a nesting ratio corresponding to a newly selected rate set and to re-select nested sub-lattices to achieve the re-selected nesting ratio, and wherein the DPC coder is configured to:
establish a fine lattice;
define a group nested sub-lattices of the fine lattice, wherein each sub-lattice represents a nesting ratio associated with an achievable data rate;
select at least one sub-lattice to achieve the selected rate set;
modulate data streams using selected nested sub-lattices;
pre-cancel and combine the modulated data streams into a single signal vector; and
quantize the single signal vector onto a fine lattice for transmission to the plurality of WTRUs.

6. The transmitter of claim 5, further comprising:
a padding unit coupled to the MAC entity configured to insert known data throughout the data streams; and
a coder coupled to the padding unit configured to perform point-to-point coding on the padded data streams and to provide the coded data streams to the DPC coder.

7. The transmitter of claim 5, wherein said transmitter is further configured to combine the single signal vector with selected rate set information for transmission to the plurality of WTRUs.

* * * * *

UNITED STATES PATENT AND TRADEMARK OFFICE
CERTIFICATE OF CORRECTION

PATENT NO.        : 7,596,112 B2
APPLICATION NO. : 11/321806
DATED             : September 29, 2009
INVENTOR(S)       : Reznik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 876 days.

Signed and Sealed this

Twenty-eighth Day of September, 2010

David J. Kappos
*Director of the United States Patent and Trademark Office*